Patented Feb. 10, 1931

1,792,006

UNITED STATES PATENT OFFICE

CARLETON ELLIS, OF MONTCLAIR, NEW JERSEY, ASSIGNOR TO ELLIS-FOSTER COMPANY, A CORPORATION OF NEW JERSEY

PROCESS OF APPLYING HOOD CAPS TO BOTTLES

No Drawing.  Application filed November 19, 1925.  Serial No. 70,203.

This invention relates to a process of applying hood caps to bottles, especially chilled milk bottles.

In carrying out the process, I make use of a hood cap made from fibrous material, for example, paper, and preferably employ single ply paper, crimping this usually somewhat into the shape of a ramekin, and pressing into final engagement around the bottle mouth or flange. As a binder to hold the cap in suitable engagement, I may use hard waxes, such as, carnauba, candelilla, Montan, and shellac wax, metallic soaps of appropriate melting point, rosin, or other resins, and resinates, or mixtures of these substances with each other, or with softer waxes, e. g., paraffin or special adhesive products, such as, chicle, gutta percha, balata, rubber, and the like. In some cases sulphur may be used as the sole binding agent, or it may be employed in admixture with appropriate substances.

The paper stock, e. g., discs, or the crimped ramekin type referred to above, may be impregnated throughout with the binding agent, or the sides or skirted portion of the ramekin alone may be impregnated, and/or coated with the binder.

It is important that the binder or binding composition be one which does not foul the glass, when the bottle, as is the case in the milk industry, is used repeatedly. In other words, after thorough washing, as in dairy practice, there should not be left any waxy or greasy film on the bottle. Binders vary greatly among themselves with respect to the ease with which they strip from glass. The waxes of high melting point, such as, carnauba or shellac wax, strip from glass with a freedom which is not shown by paraffin wax, rosin, and various other substances.

Experiments which I have made show that even among the waxes of high melting point there is a difference, within limits, in the peeling or stripping from glass, depending on the temperature of the wax at the time of application to the cool glass. Molten wax of the high melting point, if applied very hot, shows a noticeable tendency to "wet" glass, and adherence to the glass begins to manifest itself to a certain slight degree. Applied at a lower temperature, say, just at the point of congelation or solidification, it will be found that the adherence is practically nil, and a very decided peeling or stripping effect is evident.

Substances capable of being cooled below the melting point, while still retaining a liquid state, or those having a long range of plasticity in changing from the solid to the liquid state, such, for example, as some resinous mixtures, behave in a like manner to a degree depending on the material and varying greatly with different materials. Thus, although rosin, for example, adheres to glass and does not exhibit a peeling effect characteristic of the waxes of high melting point, the same conditions obtain to a certain extent, namely, that the higher the temperature, the greater the degree of adhesion.

Thus, I can regulate and control, within limits, varying characteristically with each substance or mixtures of substances used as the binding material, the degree of adhesion or the stripping effect, as the case may be.

The temperature of the bottle at the time of application of the hood cap carrying the molten binder, should be considered in connection with the adaptation of the invention to any particular set of conditions. In the case of milk bottles, the temperature at the time of applying the cap in usual dairy practice, is about 10° C., and the application of the cap to this chilled surface, tends in itself to reduce adhesion slightly.

The invention in its preferred form therefore, may be stated to involve the process of applying binder-carrying hood caps to chilled milk bottles, or other glass containers, wherein the step is utilized, which comprises pressing the crimped or skirted side of a hood cap into final engagement around the bottle mouth and flange thereof, while said hood cap and binder is at a temperature predetermined to control the degree of adhesion of the cap to the bottle, and preferably in the case of substances which are normally more adhesive, in having the temperature during application to the bottle, relatively low, e. g., at or just above the melting point, or in some cases, below the melting point, and while the substance is still in a substantially plastic condition; while on the other hand with substances such as the waxes of high melting point, which peel freely from glass, in which case slight adhesion may be desired, the temperature at the time of application to the bottle may be many degrees above the melting point of the wax.

From the foregoing it will be evident that the invention may be illustrated by very simple examples.

Heavy paper is made from a mixture of equal parts of ground spruce and sulphite pulp. The thickness represented by the grade 16 point is desirable, as with paper of this thickness a larger proportion of binder is absorbed than would be the case with thinner papers. In the preferred form of the invention, it is proposed to have the fibres of the hood cap skirt well impregnated with the binder, but with little or no excess to form a coating on the paper. With thin paper, in order to get the requisite strength, a considerable coating of binder may be required, and this may drip onto the bottle when the cap is crimped around the mouth flange, and thus the bottle will have an unsightly appearance. Hence, I prefer to use a grade of paper of 16 point, or thereabouts, in order to absorb that quantity of binder which will give the requisite strength.

The caps may be made by cold drawing, because when so made, they appear to remain in place more effectively than when hot drawn. Hot drawing of the hood caps, however, is not precluded.

In whatever manner the ramekin is formed, it is treated with a binder, for example, carnauba wax 80 parts, rosin 18 parts, and sulphur 2 parts, all by weight. These substances are melted together and the ramekins nested to form stacks, and sprayed or otherwise treated with the binder. The stacks of treated caps may be heated to allow impregnation of the binder to occur to any desired degree. This procedure gives a cap with the binder substantially only on the skirted portion.

Now heat some of the caps in an oven to 150° C., remove and quickly apply to a milk bottle maintained at a temperature of about 10 or 15° C. Compress immediately with a clamping or crimping tool and allow to set for several seconds. A cap applied in this manner will be found to have a definite degree of mild adhesion.

On the other hand, apply the cap with the same binder at a temperature very close to the congealing point. The adhesion will be found practically nil. By varying the temperature through the intermediate range, changed effects can be secured in a controllable manner, free from conditions of a haphazard character.

Allow carnauba wax at 200° C., to drip down the sides of a bottle. Mild adhesion will be observed. Allow the same wax at a temperature above the melting point, but below, say 100° C., to drip down over glass and when cold the solidified dripping often will strip spontaneously from glass, curling away from the surface as though repelled thereby.

Again, carnauba wax may be applied to a hood cap, and the cap with binder is heated to 90° C., or slightly higher, and then clamped on a milk bottle. Very free stripping from glass takes place in the product thus obtained. On the other hand, when the cap and binder is heated to 150° C., or higher, there is an indication of mild adhesion.

On applying a slight twisting action with the hand, to the cap, which was heated to about 90° C., when placed on the bottle, it will be found that such a cap is likely to rotate rather readily about the mouth flange; whereas, if it is applied at 150° C., or higher, it will be found more firmly in contact with the bottle mouth.

Instead of single-ply paper, it is possible to use multi-ply or laminated sheets, or sheets made from pulp, which have been bound together with the wax, resin, resinate, or other substance of an appropriate character.

In using the high melting point waxes, preferably as I have indicated, I seek to secure a very mild degree of adhesion, to prevent free rotation of the cap on the bottle mouth in the ordinary course of handling, and therefore may heat the cap and binder, prior to application to the bottle, to a temperature of from 10 to 50° above the melting point of the binder. In the case of sulphur, which becomes very viscous and sticky at a temperature of about 160° C., being at that temperature too sticky to allow the caps to be fed easily from a feeding device onto the bottles, I preferably employ a temperature just above the melting point, or around 120° C., but not in excess of 140° C., in the cap heating oven.

Ordinary paraffin wax, by itself, I do not find satisfactory as a binder for hood caps applied in accordance with the provisions aforesaid.

What I claim is:

The process of applying binder-carrying hood caps to containers which comprises applying the cap to the container while maintaining the temperature high enough to lend plasticity to the binder, but low enough to limit the adhesion of the cap to the container.

CARLETON ELLIS.